United States Patent
Brebner

(10) Patent No.: US 11,169,910 B2
(45) Date of Patent: Nov. 9, 2021

(54) PROBABILISTIC SOFTWARE TESTING VIA DYNAMIC GRAPHS

(71) Applicant: HEWLETT PACKARD ENTERPRISE DEVELOPMENT LP, Houston, TX (US)

(72) Inventor: Gavin Brebner, St. Martin d'Uriage (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/819,641

(22) Filed: Mar. 16, 2020

(65) Prior Publication Data

US 2020/0349063 A1    Nov. 5, 2020

(30) Foreign Application Priority Data

Apr. 30, 2019  (EP) .................................. 19305560

(51) Int. Cl.
*G06F 9/44* (2018.01)
*G06F 11/36* (2006.01)
(Continued)

(52) U.S. Cl.
CPC ............ *G06F 11/3688* (2013.01); *G06F 9/54* (2013.01); *G06F 11/3476* (2013.01);
(Continued)

(58) Field of Classification Search
CPC ............ G06F 11/3688; G06F 11/3476; G06F 11/3608; G06F 11/3676; G06F 11/302;
(Continued)

(56) References Cited

U.S. PATENT DOCUMENTS 6,820,072 B1 * 11/2004 Skaanning .......... G06F 11/3608
706/52
7,590,520 B2 * 9/2009 Nachmanson ...... G06F 11/3676
703/22
(Continued)

FOREIGN PATENT DOCUMENTS

WO       2017/023299 A1    2/2017

OTHER PUBLICATIONS

Huaizhong Li et al., Software Test Data Generation Using Ant Colony Optimization, Jan. 2005, [Retrieved on Jul. 1, 2021], Retrieved from the internet: <URL: https://citeseerx.ist.psu.edu/viewdoc/download?doi=10.1.1.96.8634&rep=rep1&type=pdf> 4 Pages (1-4) (Year: 2005).*

(Continued)

*Primary Examiner* — Anibal Rivera
(74) *Attorney, Agent, or Firm* — Jaffery Watson Mendonsa & Hamilton

(57) ABSTRACT

Systems and methods described in the present disclosure provide a software testing framework that leverages information about actual consumer interactions with a software product to create a directed graph. The directed graph is be used to generate a large number of simulated consumer interactions to test the software product in a manner such that scenarios shown to be more likely in practice are proportionally more likely to be generated during testing. Furthermore, the directed graph can be updated dynamically so that changing trends in actual consumer interactions with the software product are reflected immediately.

14 Claims, 7 Drawing Sheets

(51) Int. Cl.
  *G06F 16/901* (2019.01)
  *G06F 9/54* (2006.01)
  *G06F 11/34* (2006.01)
  *G06F 17/18* (2006.01)
  *G06F 9/50* (2006.01)
  *G06F 9/451* (2018.01)

(52) U.S. Cl.
  CPC .......... *G06F 16/9024* (2019.01); *G06F 17/18* (2013.01); *G06F 9/451* (2018.02); *G06F 9/5072* (2013.01); *G06F 11/3608* (2013.01); *G06F 11/3676* (2013.01)

(58) Field of Classification Search
  CPC .............. G06F 11/3006; G06F 11/079; G06F 16/9024; G06F 16/90; G06F 9/54; G06F 9/5072; G06F 9/451; G06F 9/44589; G06F 17/18; G06F 8/75; G06F 8/77; G06F 11/3684
  See application file for complete search history.

(56) References Cited

U.S. PATENT DOCUMENTS

| | | | | |
|---|---|---|---|---|
| 7,949,960 | B2 * | 5/2011 | Roessler | G06F 9/451 715/812 |
| 8,977,577 | B2 * | 3/2015 | Forte | G06Q 30/02 706/12 |
| 9,104,525 | B2 * | 8/2015 | Dang | G06F 8/75 |
| 2003/0046609 | A1 * | 3/2003 | Farchi | G06F 11/3676 714/30 |
| 2005/0160404 | A1 * | 7/2005 | Nachmanson | G06F 11/3676 717/124 |
| 2008/0052692 | A1 * | 2/2008 | Chockler | G06F 9/44589 717/151 |
| 2009/0094076 | A1 * | 4/2009 | Reddy | G06Q 10/06 705/7.41 |
| 2011/0208469 | A1 * | 8/2011 | Sheye | G06F 11/3684 702/123 |
| 2013/0097125 | A1 * | 4/2013 | Marvasti | G06F 16/90 707/692 |
| 2015/0106324 | A1 * | 4/2015 | Puri | G06F 11/079 706/52 |
| 2016/0210219 | A1 * | 7/2016 | Chu | G06F 9/5072 |
| 2016/0232446 | A1 * | 8/2016 | Singh | G06N 7/005 |
| 2019/0057015 | A1 * | 2/2019 | Hassan | G06F 11/3006 |
| 2019/0057213 | A1 * | 2/2019 | Hassan | H04L 67/141 |
| 2019/0058761 | A1 * | 2/2019 | Hassan | H04L 67/02 |
| 2019/0236223 | A1 * | 8/2019 | Banerjee | G06F 30/20 |
| 2020/0097389 | A1 * | 3/2020 | Smith | G06F 11/0775 |
| 2020/0162352 | A1 * | 5/2020 | Jorgenson | G06F 11/302 |
| 2021/0089375 | A1 * | 3/2021 | Ghafourifar | G06F 9/543 |

OTHER PUBLICATIONS

Velur Rajappa et al., Efficient Software Test Case Generation Using Genetic Algorithm Based Graph Theory, 2008, [Retrieved on Jul. 1, 2021], Retrieved from the internet: <URL: https://ieeexplore.ieee.org/stamp/stamp.jsp?tp=&arnumber=4579914> 6 Pages (298-303) (Year: 2008).*

Extended European Search Report received for EP Patent Application No. 19305560.5, dated Sep. 27, 2019, 7 pages.

Kostakos et al., "Modelling Smartphone Usage: A Markov State Transition Model", UbiComp '16, Sep. 12-16, 2016, 12 pages.

* cited by examiner

| Example Action Sequences |
| --- |
| (E, D, C, D, A, D, D, D, B) |
| (A, F, G) |
| (C, F, C, B, E, B, D, A, A, H) |
| (E, F, C, G, H, D, D, C, E, A) |
| (G, B, A, D, B, B) |
| (A, C) |
| (H, A, E, A, B) |
| (F, F, B, B, B, A, E, F, B) |
| (A, D, G, F, G, F, A, C, F, E) |
| (C, B, C, D, F, G, A) |

COUNTS FOR SUCCESSIVE ACTION TYPES IN EXAMPLE ACTION SEQUENCES

| | | Second Action Type | | | | | | | |
|---|---|---|---|---|---|---|---|---|---|
| | | A | B | C | D | E | F | G | H |
| First Action Type | A | 1 | 1 | 2 | 3 | 2 | 1 | 0 | 1 |
| | B | 2 | 2 | 1 | 1 | 1 | 0 | 0 | 0 |
| | C | 0 | 2 | 0 | 2 | 1 | 2 | 1 | 0 |
| | D | 2 | 1 | 2 | 3 | 0 | 1 | 1 | 0 |
| | E | 2 | 1 | 0 | 1 | 0 | 2 | 0 | 0 |
| | F | 1 | 2 | 2 | 0 | 1 | 1 | 3 | 0 |
| | G | 1 | 1 | 0 | 0 | 0 | 2 | 0 | 1 |
| | H | 1 | 0 | 0 | 1 | 0 | 0 | 0 | 0 |

ASSOCIATED EDGE PROBABILITIES

| | | Second Action Type | | | | | | | |
|---|---|---|---|---|---|---|---|---|---|
| | | A | B | C | D | E | F | G | H |
| First Action Type | A | 0.090909 | 0.090909 | 0.181818 | 0.272727 | 0.181818 | 0.090909 | 0 | 0.090909 |
| | B | 0.285714 | 0.285714 | 0.142857 | 0.142857 | 0.142857 | 0 | 0 | 0 |
| | C | 0 | 0.25 | 0 | 0.25 | 0.125 | 0.25 | 0.125 | 0 |
| | D | 0.2 | 0.1 | 0.2 | 0.3 | 0 | 0.1 | 0.1 | 0 |
| | E | 0.333333 | 0.166667 | 0 | 0.166667 | 0 | 0.333333 | 0 | 0 |
| | F | 0.1 | 0.2 | 0.2 | 0 | 0.1 | 0.1 | 0.3 | 0 |
| | G | 0.2 | 0.2 | 0 | 0 | 0 | 0.4 | 0 | 0.2 |
| | H | 0.5 | 0 | 0 | 0.5 | 0 | 0 | 0 | 0 |

FIG. 2C

PROBABILISTIC SOFTWARE TESTING VIA DYNAMIC GRAPHS

BACKGROUND

In the modern world, computing devices of many different types are ubiquitous. However, one unifying trait that computing devices of different types have in common is that they execute software. Software that is well written generally results in a better quality of experience (QoE) for device users, while software that is buggy and error prone typically leads to a poor overall QoE for device users.

To ensure that software is properly vetted and updated, many software vendors create automated testing suites. Software engineers use these testing suites to identify bugs at each stage of development so that those bugs can be corrected, thereby ensuring a better QoE for software consumers.

BRIEF DESCRIPTION OF THE DRAWINGS

Various features and advantages will become apparent from the following description, given by way of example only, which is made with reference to the accompanying drawings, of which:

FIG. 2A provides a table of example action sequences for creating a directed graph, according to one example.

FIG. 2B provides a table of counts of successive action types in the example action sequences provided in the table of FIG. 2A.

FIG. 2C provides a table 203 of the probabilities associated with the edges that map to the entries in the table 202 of FIG. 2B.

DETAILED DESCRIPTION

Figure 1:
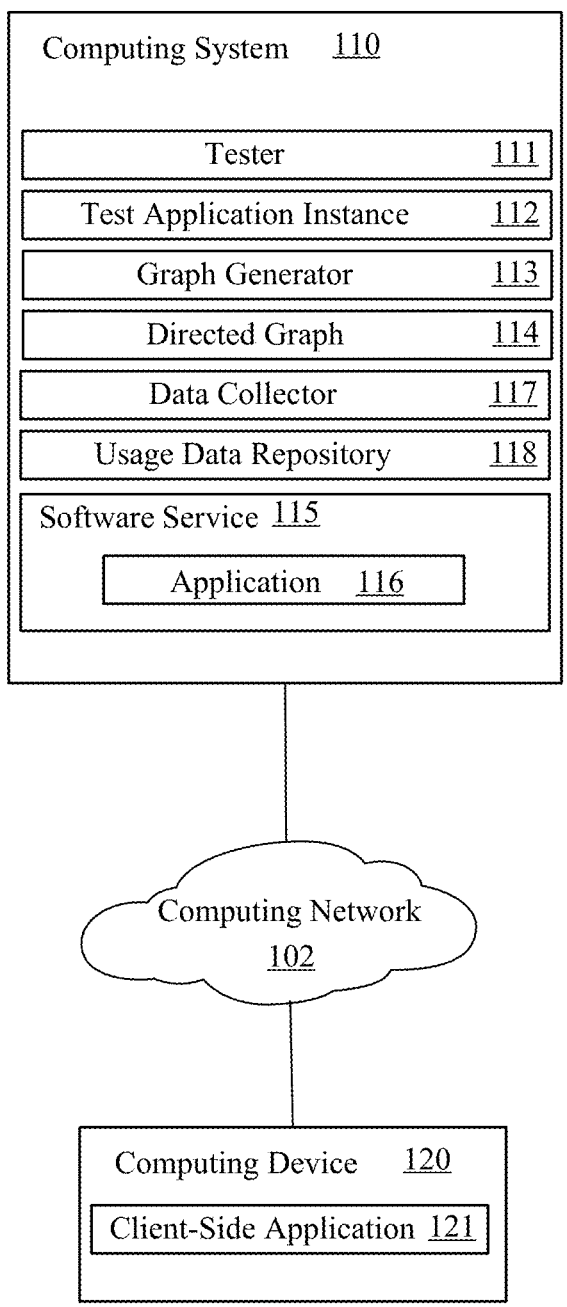
FIG. 1 illustrates a computing environment in which systems described herein may operate, according to one embodiment.

Automated testing suites are a useful resource for software engineers. Existing automated testing suites are typically apply a deterministic approach to identify errors that occur when a software unit under test is operating in state that can be identified and defined beforehand. However, for software that is highly complicated, there are a number of problems that hamper the effectiveness of existing automated testing suites. For example, for software applications that are highly complicated (e.g., containing millions of lines of code), writing a deterministic test for every possible state of those software applications is intractable.

A broader QoE question that software developers consider is how to design software that not is only not only unhampered by frequent errors, bugs, but is also tailored to the way that consumers interact with the software. To address this problem, some software packages collect and send usage data to a central repository for analysis. Consumers may also provide feedback in the form of reviews or survey responses.

However, consumers are often very remote from the QoE specialists who analyze consumer feedback and the software engineers who write the program code for applications. Information from those with direct customer access tends to be processed or interpreted by those people not QoE specialists before it reaches the QoE specialists and software engineers. Often, the information the QoE specialists receive lacks detail and is minimally actionable.

QoE specialists may be able to formulate some use cases that model how consumers are expected to interact with a software product. Software engineers can apply those use cases to drive software development and testing, but the assumptions underlying those use cases often do not hold in practice.

New use cases can be generated based on feedback and usage data, but it still may be intractable to consider every possible use case individually. Furthermore, data storage constraints and consumer privacy concerns may oblige QoE specialists to limit how much data is collected from each consumer interaction with a piece of software. As a result, creating a test suite that tests how a software product performs in a wide range of consumer interaction scenarios, yet focuses on interaction scenarios that are more likely to occur in practice in proportion to how likely they are to occur in practice, is challenging.

Systems and methods described in the present disclosure provide a software testing framework that leverages information about actual consumer interactions with a software product to create a directed graph. The directed graph can be used to generate a large number of simulated consumer interactions probabilistically for testing purposes. The composition of the directed graph is such that interaction scenarios shown to be more likely in practice are proportionally more likely to be generated during testing. Furthermore, the directed graph can be updated dynamically so that changing trends in actual consumer interactions with the software product are reflected immediately—even in tests that began executing before the directed graph was updated.

FIG. 1 illustrates a computing environment 100 in which systems described herein may operate, according to one embodiment. As shown, the computing environment 100 includes a computing system 110. For simplicity in explaining concepts described herein, the computing system 110 is shown as a single unit. However, persons of skill in the art will understand that features, functions, and modules attributed to the computing system 110 may actually be shared across many different units. For example, in one implementation, the functions of the computing system 110 may be performed via multiple processors, memory, and storage that are located in servers (e.g., in a server farm) distributed across one or more geographical locations.

As shown, the computing system 110 includes a software service 115 that executes an application 116. The application 116 may be, for example, a server-side component of software as a service (SAAS) that is provided to consumers who access functionality of the application 116 via a client-side application 121 (e.g., a browser or a mobile application) executing on a client computing device 120 that communicates with the computing system 110 via the computing network 102. However, in other examples, consumers may access the application 116 directly via input/output (I/O) hardware that is part of the computing system 110.

When a consumer interacts with the application 116, the consumer perform many different types of input via I/O devices (e.g., a keyboard, a mouse, or a touchscreen). For example, the consumer may provide input by clicking on an element in a graphical user interface (GUI) (e.g., a button or a link), entering text into a text field, or uploading a file. Depending on the type of input received from the consumer, the application 116 may perform one or more actions in response. For example, in response to a user request, the application 116 may execute an application-programming-interface (API) call, cause an additional GUI element to appear on a display, or cause a different page or screen to be loaded to a display on the client computing device 120. Throughout the course of the consumer's interaction with the application 116, the consumer may provide many inputs and the application 116 may take many actions in response to those inputs.

The application 116 may report information describing the user inputs, the actions taken by the application 116, and other events that occurred during the interaction (e.g., successful logons, unsuccessful logon attempts, logouts, errors, warnings, or other events stored in an event log) to a data collector 117 that executes in the computing system 110. The data collector 117 stores the information in the usage data repository 118 in a manner that indicates the sequence in which the inputs were received, the actions were taken, and the events occurred.

Furthermore, the application 116 may report additional information, such as configuration details about the computing device 120, values of environment variables during the interaction, a version of an operating system in which the application 116 was executing during the interaction, system resources used to run the application 116 (e.g., a device type, a processor type and an amount of memory used), and other information to the data collector 117. Also note that client-side application 121 may also report information to the data collector 117 directly via the computing network 102 in some examples.

The usage data repository 118 stores logs of sequences of actions performed during the consumer interactions with the application 116 that are reported in the manner described above. As noted above, there are many different types of actions and events that may be noted in the logs of sequences of actions stored in the data repository 118.

The graph generator 113 maps each action type to a corresponding vertex (a.k.a. node) in a directed graph 114. The graph generator 113 also defines a set of edges for the directed graph 114. Each edge connects two vertices: a source vertex and a target vertex. An edge indicates that an action of the action type corresponding to the source vertex occurred and that an action of the type corresponding to the target vertex occurred immediately thereafter (i.e., no other actions occurred in between) during at least one of the interactions for which a log of a sequence of actions exists in the usage data repository 118.

For each edge, the graph generator 113 calculates an associated probability. The associated probability indicates how frequently an action of the action type corresponding to the source vertex was immediately followed by an action of the type corresponding to the target vertex during the interactions for which logs of action sequences exist in the usage data repository 118. In one example, the associated probability equals the number of times an action of the action type corresponding to the source vertex was immediately followed by an action of the type corresponding to the target vertex divided by the total number of times an action of the action type corresponding to the source vertex was immediately followed by an action of any of the types recorded in the usage data repository 118.

The directed graph 114 may be stored in memory at the computing system 110 in one or more formats. For example, the directed graph 114 may be stored in a data structure in which objects represent vertices and member pointers or references contained in those objects represent edges, while another member data structure (e.g., an array or a linked list) stores the probabilities associated with the edges. In another example, the directed graph 114 may be stored as a matrix for which each entry represents an edge between a source vertex corresponding to the row of the entry and a target vertex corresponding to the column of the entry, while the actual value of the entry is the probability associated with the edge.

Once the graph generator 113 generates the directed graph 114, the tester 111 can generate (e.g., instantiate) the test application instance 112. The test application instance 112 is an instance of the same application as application 116, but is used to perform test interactions rather than to serve consumers of the application 116 directly.

To perform a test interaction, the tester 111 proceeds by identifying a vertex in the directed graph 114 that corresponds to a type of an action that was most recently performed in the test application instance 112 (referred to herein as the immediate predecessor action). For example, the test interaction has just begun, the predecessor action may be a logon operation or an API call associated therewith. Next, the tester 111 selects an edge for which the vertex is the source vertex (i.e., an out-edge of the vertex) via a pseudorandom process. The tester 111 applies the pseudorandom process such that the probability that each out-edge of the vertex will be selected matches the respective probability associated with that out-edge in the directed graph 114.

Next, the tester 111 triggers an action of the action type that corresponds to the target node of the selected edge in the test application instance 112. For example, the tester 111 may provide the test application instance 112 with a simulated consumer input that induces the test application instance 112 to perform such an action.

If the tester 111 detects that triggering the action caused an exception to occur in the test application instance 112, the tester 111 can add a description of the exception to an error log. Furthermore, the tester 111 can report the exception to the graph generator 113. In response, the graph generator 113 can increase the probability associated with the selected edge so that the tester 111 will be more likely to select the selected edge in future tests. Since the sum of the probabilities of the out-edges of the predecessor vertex should sum to one, the tester 111 can also reduce the probabilities associated with the other out-edges of the predecessor vertex.

In some cases, the triggered action may result in an error even if the test application instance 112 does not throw an exception. To detect such errors, the tester 111 can, after triggering the action, perform an assertion operation to determine whether a current value of a variable for the test application instance 112 satisfies a predefined condition. (In computer programming, is a Boolean-valued function that should evaluate to false at a particular point at the point where the function occurs in code execution if an error has occurred). If the current value does not satisfy the predefined condition, the graph generator 113 can increase the probability associated with the selected edge and reduce the probabilities associated with the other out-edges of the predecessor vertex.

To prevent the tester 111 from increasing the probability associated with the selected edge to one and reducing the probabilities associated with the other out-edges of the vertex to zero over the course of multiple tests, the tester 111 may increase the probability associated with the selected edge a rate that decays exponentially. Alternatively, the tester 111 may stop increasing the probability associated with the selected edge in response to exceptions or errors once the probability reaches a predefined threshold.

After the triggered action is complete, the tester 111 can by designate the target vertex of the selected edge as the updated predecessor edge and repeat the process described above to continue testing the test application instance 112.

The graph generator 113 can operate in parallel with the tester 111 and dynamically update the directed graph 114 when the application 116 reports a new log of an action sequence to the data collector 117. For example, when the data collector 117 stores a new log of an action sequence in the usage data repository 118, the data collector 117 can notify the graph generator 113 about the new action sequence. The graph generator 113 identifies a vertex sequence in the directed graph 114 that corresponds to the action sequence. Next, the graph generator 113 identifies a sequence of edges that connect the vertices in order in the vertex sequence. For each respective edge in the sequence of edges, the graph generator 113 can increase a respective probability associated with the respective edge and decrease the respective probabilities associated with out-edges of the vertices that are in the vertex sequence, but are not in the edge sequence.

The graph generator 113 can update the probabilities associated with the edges in the directed graph 114 while the test application instance 112 is executing so that any tests that the tester 111 is currently running can have access to the most recent version of the directed graph 114.

FIG. 2A provides a table 201 of example action sequences for creating a directed graph, according to one example.

In this example, suppose there are ten possible actions: A, B, C, D, E, F, G, and H. Also suppose that the ten action sequences shown in the table 201 represent action sequences that occurred during customer interactions with a software application.

FIG. 2B provides a table 202 of counts of successive action types in the example action sequences provided in the table 201 of FIG. 2A. Each entry in the table 202 is found at the intersection of a row and a column. The row header for an entry indicates the action type of a first action. The column header for the entry indicates the action type of a second action. The value in the entry is the count of the number of times an action of the second type immediately follows an action of the first type in action sequences listed in the table 201. Thus, the action subsequence (A, D) occurs three times, the action subsequence (F, B) occurs two times, the action subsequence (C, C) occurs zero times, and so forth.

Each entry in the table 202 maps to an edge. Specifically, for any particular entry, the action type listed in the row for the entry corresponds to a source vertex for the edge. The action type listed in the column for the entry corresponds to target vertex for the edge.

FIG. 2C provides a table 203 of the probabilities associated with the edges that map to the entries in the table 202 of FIG. 2B. The probability associated with an edge can be calculated by dividing the value of the entry in the table 202 that maps to the edge by the sum of the values of all entries in the row for that entry in the table 202.

For example, as shown in table 203, the probability that an action of type B will immediately follow an action of type D is 0.1. Similarly, the probability that an action of type F will immediately follow an action of type G is 0.4.

Figure 3:
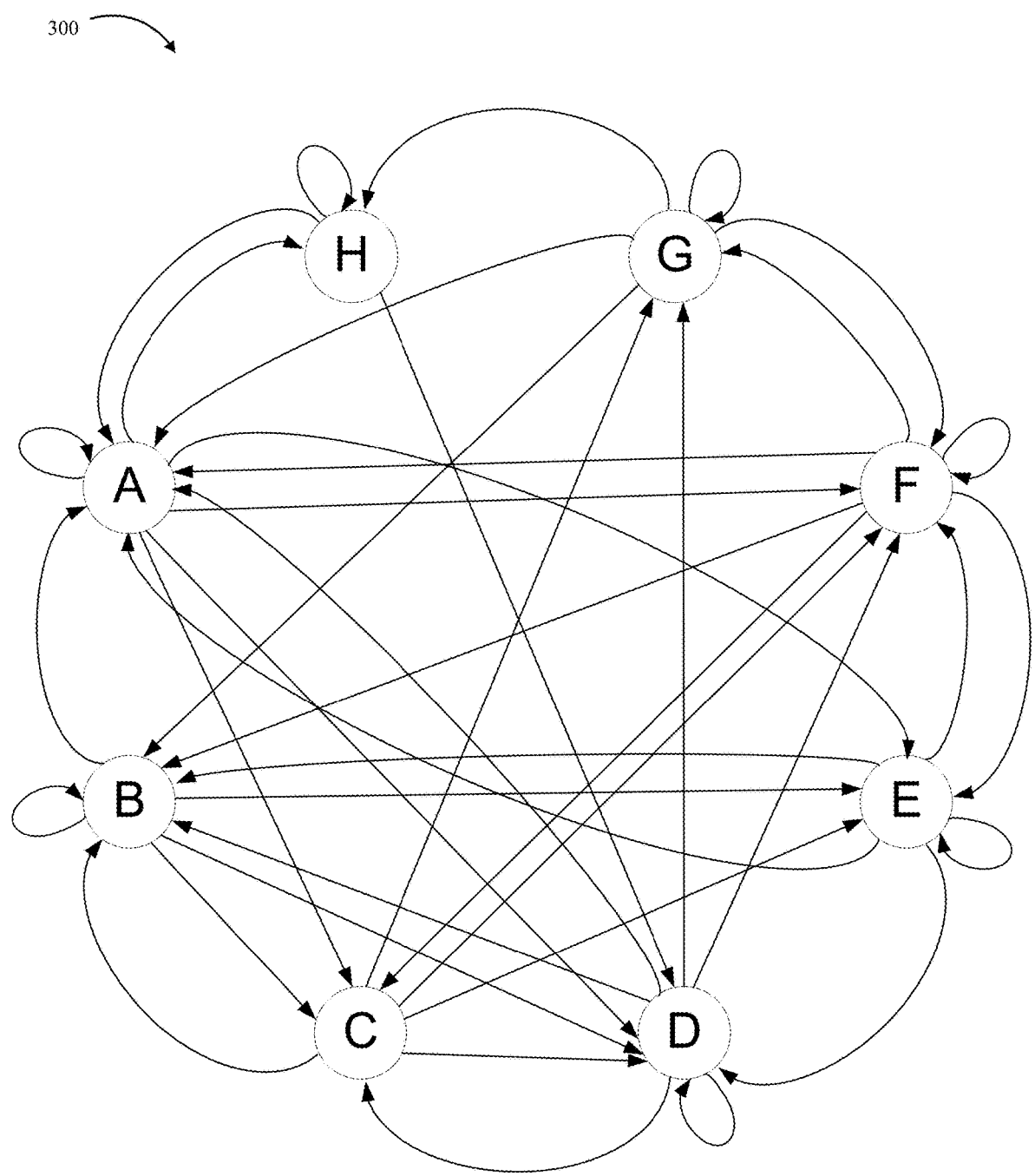
FIG. 3 illustrates a directed graph generated using the example information found in FIG. 2, according to one example.

FIG. 3 illustrates a directed graph 300 generated using the example information found in FIG. 2, according to one example. While the directed graph 300 provides is a relatively simple example of how some concepts described herein can be applied, persons of skill in the art will understand that directed graphs employed by systems described herein are likely to be much more complex. For example, a directed graph that includes vertices corresponding to each type of API call a software application is capable of making could include thousands of vertices and hundreds of thousands of edges (or more).

Figure 4:
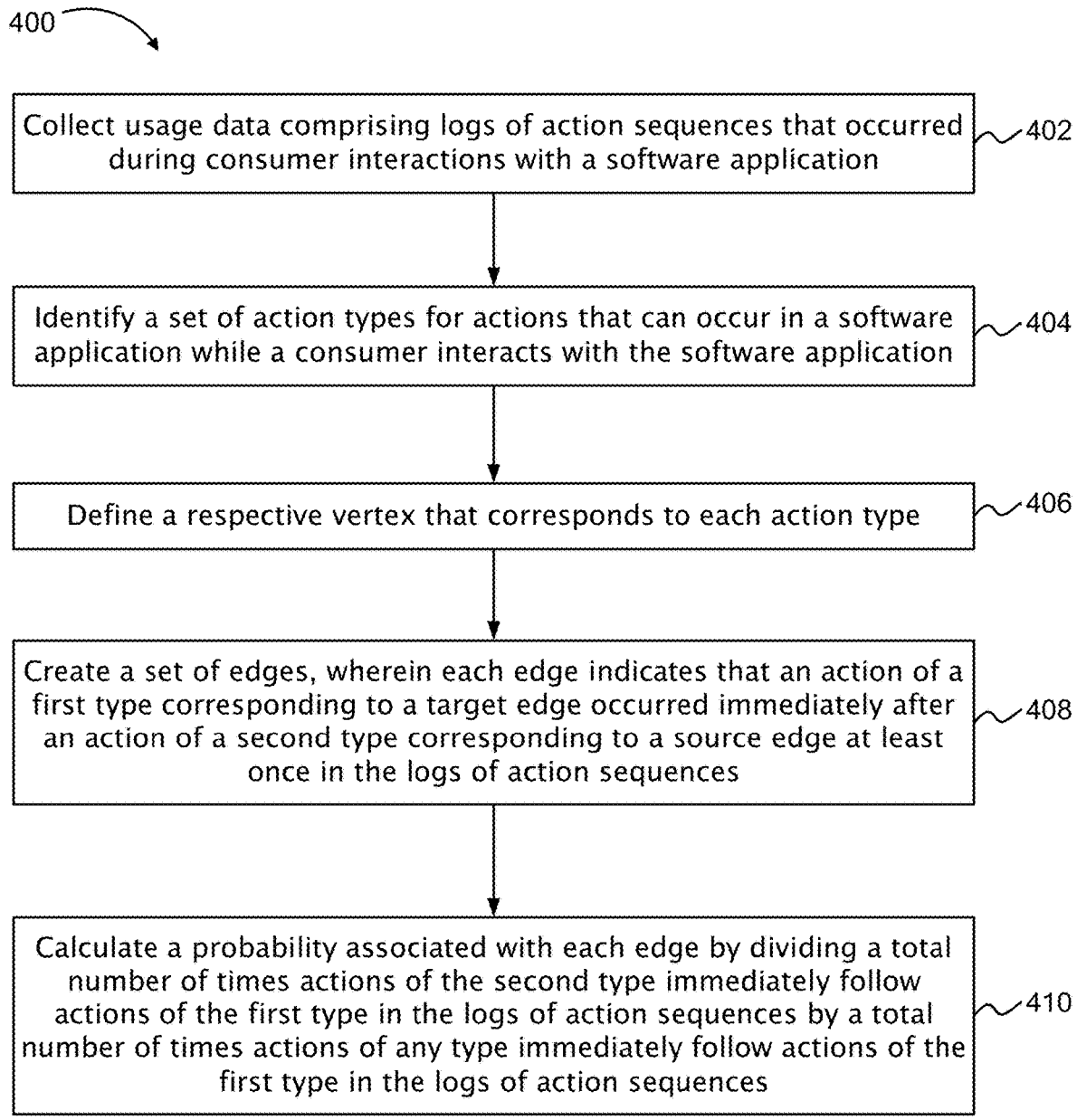
FIG. 4 provides a flow diagram that describes a technique for creating a directed graph for use in the systems described herein, according to one example.

FIG. 4 provides a flow diagram 400 describing a technique for creating a directed graph for use in the systems described herein, according to one example. The flow diagram 400 may be implemented as a method or may be executed as instructions on a machine (e.g., by one or more processors), where the instructions are included on at least one computer-readable storage medium (e.g., a transitory or non-transitory computer-readable storage medium). While only five blocks are shown in the flow diagram 400, other steps described herein may be added thereto without departing from the spirit and scope of this disclosure.

As shown in block 402, one step includes collecting usage data comprising logs of action sequences that occurred during consumer interactions with a software application.

As shown in block 404, another step includes identifying a set of action types for actions that can occur in a software application while a consumer interacts with the software application.

As shown in block 406, another step includes defining a respective vertex that corresponds to each action type.

As shown in block 408, another step includes creating a set of edges, wherein each edge indicates that an action of a first type corresponding to a target edge occurred immediately after an action of a second type corresponding to a source edge at least once in the logs of action sequences.

As shown in block 410, another step includes calculating a probability associated with each edge by dividing a total number of times actions of the second type immediately follow actions of the first type in the logs of action sequences by a total number of times actions of any type immediately follow actions of the first type in the logs of action sequences.

Figure 5:
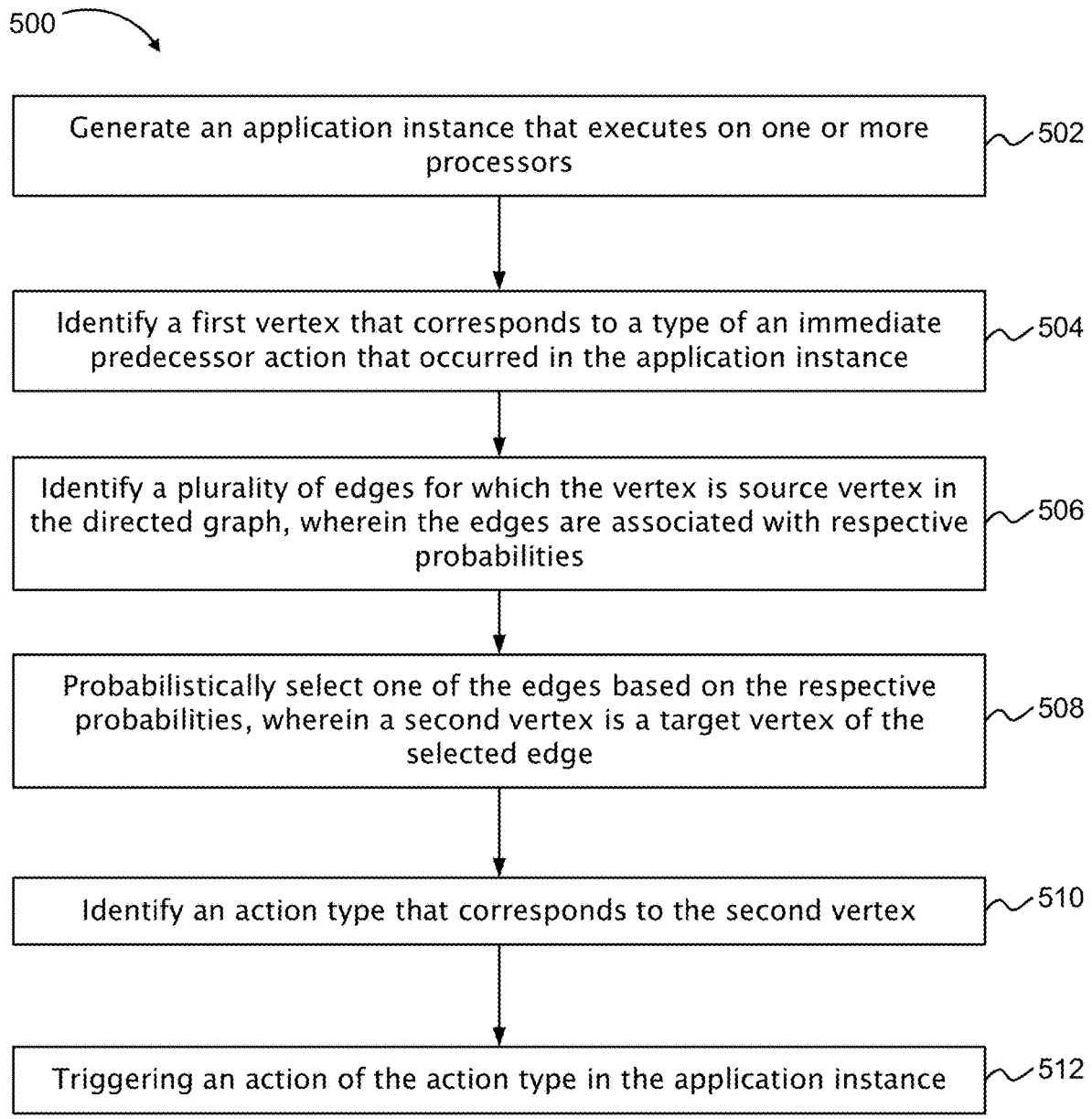
FIG. 5 provides a flow diagram describing a method for testing a software application via systems described herein, according to one example.

FIG. 5 provides a flow diagram 500 describing a method for testing a software application via systems described herein, according to one example. The flow diagram 500 may be implemented as a method or may be executed as instructions on a machine (e.g., by one or more processors), where the instructions are included on at least one computer-readable storage medium (e.g., a transitory or non-transitory computer-readable storage medium). While only six blocks are shown in the flow diagram 500, other steps described herein may be added thereto without departing from the spirit and scope of this disclosure.

As shown in block 502, one step includes generating an application instance that executes on one or more processors.

As shown in block 504, another step includes identifying a first vertex that corresponds to a type of an immediate predecessor action that occurred in the application instance. The vertex is part of a directed graph.

As shown in block 506, another step includes identifying a plurality of edges for which the vertex is source vertex in the directed graph, wherein the edges are associated with respective probabilities.

As shown in block 508, another step includes probabilistically selecting one of the edges based on the respective probabilities, wherein a second vertex is a target vertex of the selected edge.

As shown in block 510, another step includes identifying an action type that corresponds to the second vertex.

As shown in block 512, another step includes triggering an action of the action type in the application instance. In one example, the action is an API call.

In some examples, another step may include detecting that triggering the action caused an exception in the application instance, increasing a probability associated with the selected edge in response to the detecting, and adding a description of the exception to an error log.

Another step may include, after triggering the action, performing an assertion operation to determine whether a current value of a variable for the application instance satisfies a predefined condition. Furthermore, another step may include, upon determining that the current value does not satisfy the predefined condition, increasing a probability associated with the selected edge.

In some examples, other steps may include: receiving, via a computing network, a log of a sequence of actions performed in a second application instance; identifying a sequence of vertices in the directed graph that corresponds to the sequence of actions; identifying a sequence of edges that connect the vertices in the sequence of vertices; and for each respective edge in the sequence of edges: increasing a respective probability associated with the respective edge, and decreasing a probability associated with an additional edge, wherein the additional edge and the respective edge are both out-edges of a single vertex in the sequence of vertices.

Additional steps may include: identifying a second plurality of edges for which the second vertex is a source vertex in the directed graph; probabilistically selecting a second edge from the second plurality of edges based on a probability associated with the second edge, wherein a third vertex is a target vertex of the second edge; identifying a second action type that corresponds to the third vertex; and triggering an action of the second action type in the application instance.

While the present apparatuses and systems may be susceptible to various modifications and alternative forms, the embodiments discussed above have been provided only as examples. It is to be understood that the apparatuses and systems are not intended to be limited to the particular examples disclosed herein. Indeed, the present apparatuses and systems include all alternatives, modifications, and equivalents falling within the true spirit and scope of the appended claims.

What is claimed is:

1. A method comprising:
   generating an application instance that executes on one or more processors;
   identifying a first vertex that corresponds to a type of an immediate predecessor action that occurred in the application instance, wherein the first vertex is part of a directed graph;
   identifying a plurality of edges for which the first vertex is a source vertex in the directed graph, wherein the plurality of edges are associated with respective probabilities;
   probabilistically selecting a selected edge from the plurality of edges based on the respective probabilities, wherein a second vertex is a target vertex of the selected edge;
   identifying an action type that corresponds to the second vertex;
   triggering an action of the action type in the application instance;
   after triggering the action, performing an assertion operation to determine whether a current value of a variable for the application instance satisfies a predefined condition; and
   upon determining that the current value does not satisfy the predefined condition, increasing a probability associated with the selected edge and reducing probabilities for other edges of the plurality of edges.

2. The method of claim 1, wherein the action is an application-programming-interface (API) call.

3. The method of claim 1, further comprising:
   receiving, via a computing network, a log of a sequence of actions performed in a second application instance;
   identifying a sequence of vertices in the directed graph that corresponds to the sequence of actions;
   identifying a sequence of edges that connect the vertices in the sequence of vertices; and
   for each respective edge in the sequence of edges:
      increasing a respective probability associated with the respective edge, and
      decreasing a probability associated with an additional edge, wherein the additional edge and the respective edge are both out-edges of a single vertex in the sequence of vertices.

4. The method of claim 3, further comprising:
   identifying a second plurality of edges for which the second vertex is a source vertex in the directed graph;
   probabilistically selecting a second edge from the second plurality of edges based on a probability associated with the second edge, wherein a third vertex is a target vertex of the second edge;
   identifying a second action type that corresponds to the third vertex; and
   triggering an action of the second action type in the application instance.

5. The method of claim 1, further comprising:
   detecting that triggering the action caused an exception in the application instance;
   increasing a probability associated with the selected edge in response to the detecting; and
   adding a description of the exception to an error log.

6. A system comprising:
   one or more processors; and
   a memory storing instructions that, when executed on the one or more processors, cause the one or more processors to perform the following:
      generating an application instance that executes on one or more processors;
      identifying a first vertex that corresponds to a type of an immediate predecessor action that occurred in the application instance, wherein the first vertex is part of a directed graph;
      identifying a plurality of edges for which the first vertex is source vertex in the directed graph, wherein the plurality of edges are associated with respective probabilities;
      probabilistically selecting a selected edge from the plurality of edges based on the respective probabilities, wherein a second vertex is a target vertex of the selected edge;
      identifying an action type that corresponds to the second vertex; and
      triggering an action of the action type in the application instance;

after triggering the action, performing an assertion operation to determine whether a current value of a variable for the application instance satisfies a predefined condition; and upon determining that the current value does not satisfy the predefined condition, increasing a probability associated with the selected edge and reducing probabilities for other edges of the plurality of edges.

7. The system of claim 6, wherein the action is an application-programming-interface (API) call.

8. The system of claim 6, wherein the instructions, when executed on the one or more processors, further cause the one or more processors to perform the following:
receiving, via a computing network, a log of a sequence of actions performed in a second application instance;
identifying a sequence of vertices in the directed graph that corresponds to the sequence of actions;
identifying a sequence of edges that connect the vertices in the sequence of vertices; and
for each respective edge in the sequence of edges:
increasing a respective probability associated with the respective edge, and
decreasing a probability associated with an additional edge, wherein the additional edge and the respective edge are both out-edges of a single vertex in the sequence of vertices.

9. The system of claim 8, wherein the instructions, when executed on the one or more processors, further cause the one or more processors to perform the following:
identifying a second plurality of edges for which the second vertex is a source vertex in the directed graph;
probabilistically selecting a second edge from the second plurality of edges based on a probability associated with the second edge, wherein a third vertex is a target vertex of the second edge;
identifying a second action type that corresponds to the third vertex; and
triggering an action of the second action type in the application instance.

10. The system of claim 6, wherein the instructions, when executed on the one or more processors, further cause the one or more processors to perform the following:
detecting that triggering the action caused an exception in the application instance;
increasing a probability associated with the selected edge in response to the detecting; and
adding a description of the exception to an error log.

11. A non-transitory computer-readable storage medium containing instructions thereon that, when executed on a processor, cause the processor to perform the following:
generating an application instance that executes on one or more processors;
identifying a first vertex that corresponds to a type of an immediate predecessor action that occurred in the application instance, wherein the first vertex is part of a directed graph;
identifying a plurality of edges for which the first vertex is source vertex in the directed graph, wherein the plurality of edges are associated with respective probabilities;

probabilistically selecting a selected edge from the plurality of edges based on the respective probabilities, wherein a second vertex is a target vertex of the selected edge;
identifying an action type that corresponds to the second vertex; and
triggering an action of the action type in the application instance;
after triggering the action, performing an assertion operation to determine whether a current value of a variable for the application instance satisfies a predefined condition; and
upon determining that the current value does not satisfy the predefined condition, increasing a probability associated with the selected edge and reducing probabilities for other edges of the plurality of edges.

12. The non-transitory computer-readable storage medium of claim 11, wherein the instructions, when executed on the processor, further cause the processor to perform the following:
receiving, via a computing network, a log of a sequence of actions performed in a second application instance;
identifying a sequence of vertices in the directed graph that corresponds to the sequence of actions;
identifying a sequence of edges that connect the vertices in the sequence of vertices; and
for each respective edge in the sequence of edges:
increasing a respective probability associated with the respective edge, and
decreasing a probability associated with an additional edge, wherein the additional edge and the respective edge are both out-edges of a single vertex in the sequence of vertices.

13. The non-transitory computer-readable storage medium of claim 12, wherein the instructions, when executed on the processor, further cause the processor to perform the following:
identifying a second plurality of edges for which the second vertex is a source vertex in the directed graph;
probabilistically selecting a second edge from the second plurality of edges based on a probability associated with the second edge, wherein a third vertex is a target vertex of the second edge;
identifying a second action type that corresponds to the third vertex; and
triggering an action of the second action type in the application instance.

14. The non-transitory computer-readable storage medium of claim 11, wherein the instructions, when executed on the processor, further cause the processor to perform the following:
detecting that triggering the action caused an exception in the application instance;
increasing a probability associated with the selected edge in response to the detecting; and
adding a description of the exception to an error log.

* * * * *